United States Patent [19]

Denis et al.

[11] Patent Number: 5,898,582
[45] Date of Patent: Apr. 27, 1999

[54] DEVICE COMPRISING A STACK OF THYRISTORS AND FREEWHEEL DIODES

[75] Inventors: Philippe Denis, Orleix; Serge Donnet, Aix les Bains, both of France

[73] Assignee: GEC Alsthom Transport SA, Paris, France

[21] Appl. No.: 08/837,394

[22] Filed: Apr. 17, 1997

[30] Foreign Application Priority Data

Apr. 18, 1996 [FR] France .................. 96 04870

[51] Int. Cl.⁶ ............................. H02M 3/04
[52] U.S. Cl. ..................... 363/68; 363/61; 363/141
[58] Field of Search ................. 363/59, 60, 61, 363/141, 144, 68

[56] References Cited

U.S. PATENT DOCUMENTS

| | | | |
|---|---|---|---|
| 4,338,652 | 7/1982 | Romanczuk et al. | 257/658 |
| 4,492,975 | 1/1985 | Yamada et al. | 257/785 |
| 4,785,208 | 11/1988 | Egger et al. | 257/533 |
| 4,864,385 | 9/1989 | Itahana et al. | 257/715 |
| 4,868,712 | 9/1989 | Woodman | 361/708 |
| 5,204,804 | 4/1993 | Bailey et al. | 257/718 |
| 5,561,597 | 10/1996 | Limpaecher | 363/59 |
| 5,638,266 | 6/1997 | Horie et al. | 363/56 |
| 5,675,466 | 10/1997 | Matsumoto et al. | 363/56 |

FOREIGN PATENT DOCUMENTS

| | | |
|---|---|---|
| 006971A1 | 1/1983 | European Pat. Off. . |
| 2994547 | 9/1982 | United Kingdom . |

*Primary Examiner*—Robert E. Nappi
*Assistant Examiner*—Derek J. Jardieu
*Attorney, Agent, or Firm*—Sughrue, Mion, Zinn, Macpeak & Seas, PLLC

[57] ABSTRACT

The present invention relates to a stack device comprising a stack of gate turnoff thyristors GTO, of freewheel diodes DRL, and of diodes D, for a semiconductor circuit, said stack device including power supply electrical connection terminals +HT and −HT, and an output terminal PM, together with electrical connection terminals Cs and Cc between said diodes Ds and Dc and a protection circuit P, wherein the geometrical organization of the wiring of said electrical connection terminals +HT, PM, and −HT is predetermined so as to enable the disposition of said thyristors GTO and of said freewheel diodes in said stack to be modified in order to obtain different electrical functions for the semiconductor circuit.

16 Claims, 3 Drawing Sheets

DEVICE COMPRISING A STACK OF THYRISTORS AND FREEWHEEL DIODES

The present invention relates in general to semiconductor power devices and to electrical interface devices therefor, and more particularly it relates to a device comprising a stack of thyristors and freewheel diodes.

BACKGROUND OF THE INVENTION

Power semiconductor devices are units made up of power semiconductors that may differ from one another.

By way of example, mention may be made of thyristors as power semiconductor elements and of freewheel diodes as diodes.

Such power semiconductor elements are cooled by means of cooling devices that dissipate heat by means of a flow of a cooling liquid.

Each power semiconductor element is sandwiched between two holding elements, one or both of the holding elements possibly being cooling devices.

The set of power semiconductor elements and of holding elements constitutes a single device comprising a stack of thyristors and freewheel diodes.

Such a device comprising a stack of thyristors and freewheel diodes can also be referred to as a pile.

The power semiconductor elements must be protected electrically by means of a protection circuit, i.e. by capacitors.

The various electrical connections between the power semiconductor elements and the protection circuit are made via the cooling devices, or where not available, via holding means that do not include a cooling device.

In such a structure, the holding means provide electrical continuity between two power semiconductor elements or between a power semiconductor element and a protection circuit.

In the state of the art, the sets of holding elements and of power semiconductor elements, i.e. the devices comprising stacks of thyristors and freewheel diodes, require electrical connections to be fitted.

Sets of power semiconductor elements and of holding elements may differ in the particular electrical circuit on which they are based.

The electrical power supply connections +HT and −HT, and the output PM of a device comprising a stack of gate turnoff thyristors GTO and of freewheel diodes DRL, and electrical connections Cs, Cc between the diodes Ds, Dc and the protection circuit thus differ from one electrical circuit to another.

OBJECTS AND SUMMARY OF THE INVENTION

An object of the invention is to provide a device comprising a stack of thyristors and freewheel diodes enabling a single form of wiring to be used regardless of the electrical function of the power semiconductor device.

Another object of the invention is to provide a device comprising a stack of thyristors and freewheel diodes that requires a minimum of cooling devices.

According to the invention, in a stack device comprising a stack of gate turnoff thyristors GTO and freewheel diodes DRL for a semiconductor circuit, and including electrical power supply connection terminals +HT and −HT, and an output terminal PM, the geometrical organization of the wiring of said electrical connection terminals +HT, PM, and −HT is predetermined in such a manner as to make it possible to modify the disposition of said thyristors GTO and said freewheel diodes DRL in said stack in order to obtain different electrical functions from the semiconductor circuit.

The device of the invention comprising a stack of gate turnoff thyristors GTO and of freewheel diodes DRL for a semiconductor circuit may also satisfy at least one of the following characteristics:

the device, for a converter, comprises in succession: a first cooling device R1, a first gate turnoff thyristor GTOs, a second cooling device R2, a first freewheel diode DRLs, a third cooling device R3, a second freewheel diode DRLi, a fourth cooling device R4, a second gate turnoff thyristor GTOi, and a fifth cooling device R5; said connection terminal +HT being connected to the anode of the first thyristor GTOs and to the cathode of the first freewheel diode DRLs, said connection terminal PM being connected to the anode of said freewheel diode DRLs and to the cathode of the second freewheel diode DRLi, and also to the cathode of said first thyristor GTOs and to the anode of the second thyristor GTOi, and said connection terminal −HT being connected to the anode of said second freewheel diode DRLi and to the cathode of said second thyristor GTOi;

the third cooling device R3 is replaced by a conductor element M;

the device, for a converter, comprises in succession: a first cooling device R1, a first freewheel diode DRLs, a second cooling device R2, a first gate turnoff thyristor GTOs, a third cooling device R3, a second gate turnoff thyristor GTOi, a fourth cooling device R4, a second freewheel diode DRLi, and a fifth cooling device R5; said connection terminal +HT being connected to the cathode of the first freewheel diode DRLs and to the anode of the first thyristor GTOs, said connection terminal PM being connected to the cathode of said first thyristor GTOs and to the anode of the second thyristor GTOi, and also the anode of said first freewheel diode DRLs and to the cathode of the second freewheel diode DRLi, and said connection terminal −HT being connected to the cathode of said second thyristor GTOi and to the anode of said second freewheel diode DRLi;

the first and fifth cooling devices R1 and R5 are replaced by conductor elements M;

the device, for a converter, comprises in succession: a first conductor element M'1, a first freewheel diode DRL's, a first cooling device R'1, a first gate turnoff thyristor GTO's, a second cooling device R'2, a second gate turnoff thyristor GTO'i, a third cooling device R'3, a second freewheel diode DRL'i, and a second conductor element M'2; said connection terminal +HT being connected to the cathode of the first freewheel diode DRL's and to the anode of the first thyristor GTO's, said connection terminal PM being connected to the cathode of said first thyristor GTO's and to the anode of the second thyristor GTO'i, and also to the anode of said first freewheel diode DRL's and to the cathode of the second freewheel diode DRL'i, said connection terminal −HT being connected to the cathode of said thyristor GTO'i and to the anode of said second freewheel diode DRL'i;

the device, for a converter, comprises in succession: a first cooling device R'1, a first gate turnoff thyristor GTO's, a second cooling device R'2, a first freewheel diode DRL's, a first conductor element M'1, a second freewheel diode DRL'i, a third cooling device R'3, a second gate turnoff thyristor GTO'i, and a fourth cooling device R'4; said connection terminal +HT being connected to the anode of the first thyristor GTO's and to the cathode of the first freewheel diode DRL's, said connection terminal PM being connected to the anode of said first freewheel diode DRL's and to the cathode of the second freewheel diodes DRL'i, and also to the cathode of said first thyristor GTO's and to the anode of the second thyristor GTO'i, said connection terminal −HT being connected to the anode of said second freewheel diode DRL'i and to the cathode of said second thyristor GTO'i;

the device, for a converter, comprises in succession: a first conductor element M"1, a first freewheel diode DRL"s, a cooling device R"1, a gate turnoff thyristor GTO"s, a second cooling device R"2, a second freewheel diode DRL"i, a third cooling device R"3, an insulating element I", and a second conductor element M"2; said connection terminal +HT being connected to the cathode of the first freewheel diode DRL"s and to the anode of the thyristor GTO"s, said connection terminal PM being connected to the cathode of said thyristor GTO"s and to the cathode of the said second freewheel diode DRL"i, and also to the anode of said first freewheel diode DRL"s, said connection terminal −HT being connected to the anode of said second freewheel diode DRL"i;

the third cooling device R"3 is replaced by a conductor element;

the device, for a converter, comprises in succession: a first conductor element M"1, a first freewheel diode DRL"s, a first cooling device R"1, a gate turnoff thyristor GTO"s, a second cooling device R"2, an insulating element I", a third cooling device R"3, a second freewheel diode DRL"i, and a fourth cooling device R"4; said connection terminal +HT being connected to the cathode of the first freewheel diode DRL"s and to the anode of the thyristor GTO"s, said connection terminal PM being connected to the cathode of said thyristor GTO"s and to the anode of said first freewheel diode DRL"s, and also to the cathode of the second freewheel diode DRL"i, said connection terminal −HT being connected to the anode of said second freewheel diode DRL"i;

the third cooling device R"3 or the fourth cooling device R"4 is replaced by a conductor element; and the device further includes in succession: a first diode Ds, a cooling device R, a second diode Dc, and a conductor element M; said first and second diodes Ds and Dc being reversed-biased under a voltage of potentials −HT and +HT via a capacitor Cc of a protection circuit P, a capacitor Cs of said protection circuit P being disposed between said output electrical connection terminal PM and the common terminal Cs common to said first and second diodes Ds and Dc.

An advantage of the stack device of the invention is the use of standard electrical connection means, e.g. a busbar, for electrically connecting the stack device and the protection circuit of the device.

Another advantage of the stack device of the invention is the possibility of optimizing the number of cooling devices while conserving a single connection arrangement for a plurality of applications of the semiconductor device.

Another advantage of the stack device of the invention is providing a line of standard products of the combined bridge type with forced switching or of the inverter type.

Another advantage of the stack device of the invention is providing standard products having high thermal power or lower thermal power while still retaining a single connection arrangement.

BRIEF DESCRIPTION OF THE DRAWINGS

Other objects, characteristics, and advantages of the invention appear on reading the description of preferred embodiments of the stack device, which description is given with reference to the accompanying drawings, in which.

MORE DETAILED DESCRIPTION

The device comprising a stack of gate turnoff thyristors GTO, of freewheel diodes DRL, and of diodes D in accordance with the invention is intended for use in converter type semiconductor circuits.

The stack device includes power supply electrical connection terminals +HT and −HT and an output terminal PM.

In order to make up a complete phase of a semiconductor circuit, the stack device further includes electrical connection terminals Cs, Cc, between diodes Ds, Dc and a protection circuit P.

In accordance with an essential characteristic of the invention, the stack device is such that the geometrical organization of the connections between the electrical connections terminals +HT, PM and −HT is predetermined.

As a result of this characteristic, a change in the disposition of the thyristors GTO and of the freewheel diodes DRL within the stack makes it possible to obtain various different electrical functions for the semiconductor circuit.

Figure 1:
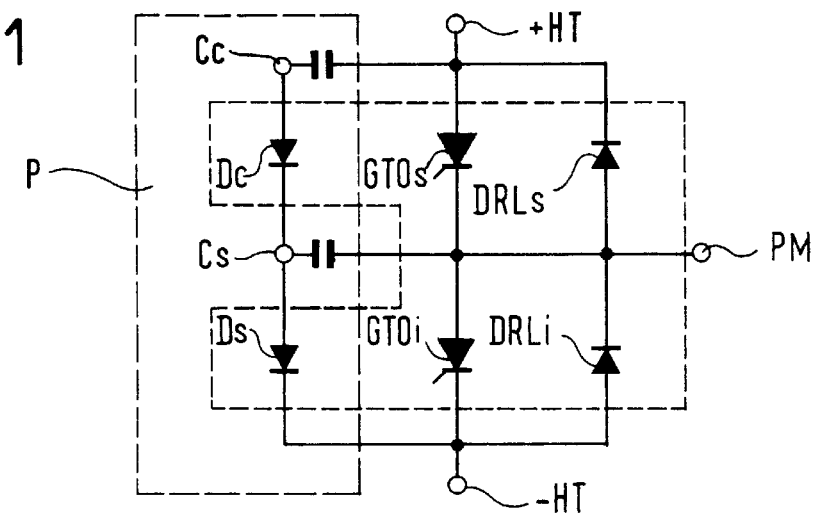
FIG. 1 shows the known electrical layout of one arm of the inverter type or of the combined bridge type converter having forced switching.

FIG. 1 shows the known electrical layout for one arm of a converter of the inverter type or of the combined bridge type having forced switching.

In applications of the combined bridge type having forced switching that require large amounts of thermal power to be evacuated, each thyristor face needs a cooling device.

Figure 2:
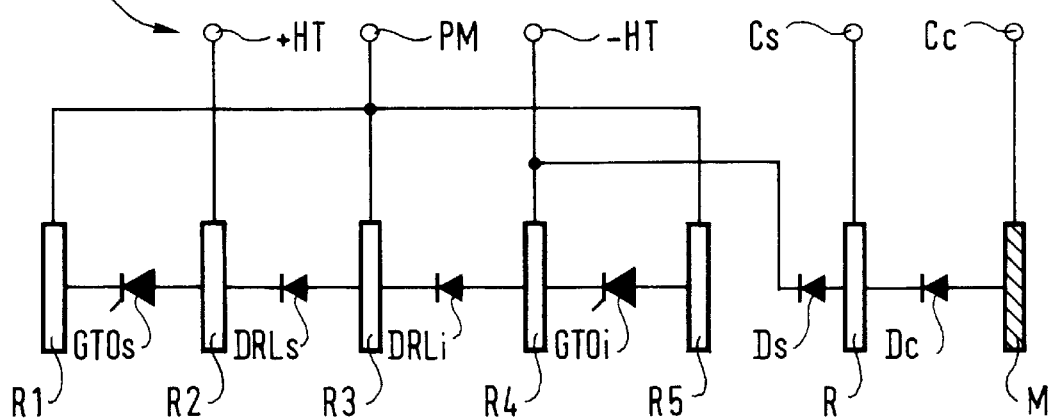
FIGS. 2 and 3 are diagrams of the stack device for a converter in general, and more particularly for a forced switching combined bridge, in accordance with the invention.
Figure 3:
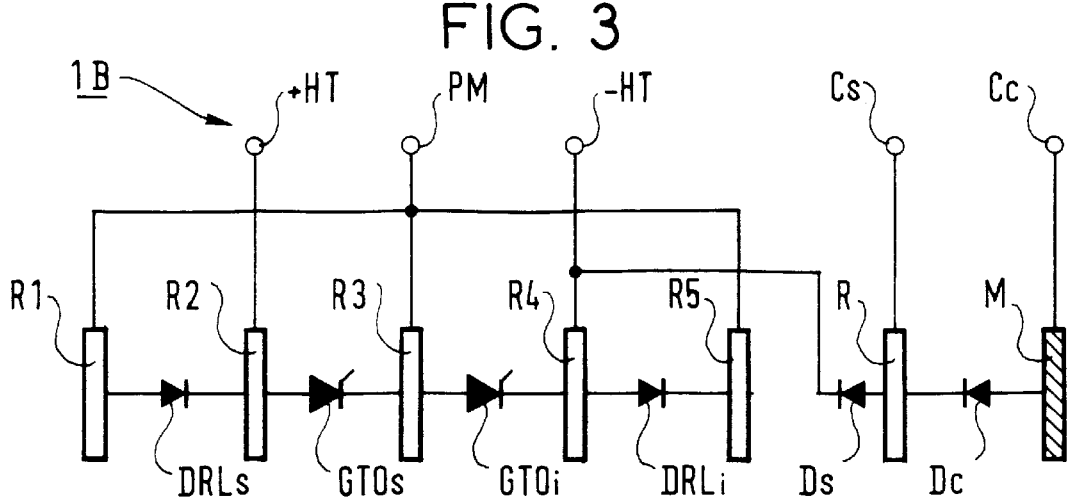

FIGS. 2 and 3 are diagrams of two preferred embodiments of the stack device for a converter, and more particularly for a combined bridge having forced switching.

As shown in FIG. 2, the stack device 1A for a combined bridge having forced switching comprises in succession: a first cooling device R1, a first gate turnoff thyristor GTOs, a second cooling device R2, a first freewheel diode DRLs, a third cooling device R3, a second freewheel diode DRLi, a fourth cooling device R4, a second thyristor GTOi, and a fifth cooling device R5.

The anode of the first thyristor GTOs is connected to the potential +HT.

The anode of the second thyristor GTOi is connected to the terminal PM.

The cathode of the first thyristor GTOs is connected to the terminal PM.

The cathode of the second thyristor GTOi is connected to the potential −HT.

The anode of the first freewheel diode DRLs is connected to the terminal PM.

The anode of the second freewheel diode DRLi is connected to the potential −HT.

The cathode of the first freewheel diode DRLs is connected to the potential +HT.

The cathode of the second freewheel diode DRLi is connected to the terminal PM.

To do this, the connection terminal +HT is connected to the anode of the first thyristor GTOs and to the cathode of the first freewheel diode DRLs.

The connection terminal PM is connected to the anode of the first freewheel diode DRLs and to the cathode of the second freewheel diode DRLi, and also to the cathode of the first thyristor GTOs and to the anode of the second thyristor GTOi.

The connection terminal −HT is connected to the anode of the second freewheel diode DRLi and to the cathode of the second thyristor GTOi.

As shown in FIG. 3, the device 1B for a forced-switching combined bridge comprises in succession: a first cooling device R1, a first freewheel diode DRLs, a second cooling device R2, a first thyristor GTOs, a third cooling device R3, a second thyristor GTOi, a fourth cooling device R4, a second freewheel diode DRLi, and a fifth cooling device R5.

The anode of the first thyristor GTOs is connected to the potential +HT.

The anode of the second thyristor GTOi is connected to the terminal PM.

The cathode of the first thyristor GTOs is connected to the terminal PM.

The cathode of the second thyristor GTOi is connected to the potential −HT.

The anode of the first freewheel diode DRLs is connected to the terminal PM.

The anode of the second freewheel diode DRLi is connected to the potential −HT.

The cathode of the first freewheel diode DRLs is connected to the potential +HT.

The cathode of the second freewheel diode DRLi is connected to the terminal PM.

To do this, the connection terminal +HT is connected to the cathode of the first freewheel diode DRLs and to the anode of the first thyristor GTOs.

The connection terminal PM is connected to the cathode of the first thyristor GTOs and to the anode of the second thyristor GTOi, and also to the anode of the first freewheel diode DRLs and to the cathode of the second freewheel diode DRLi.

The connection terminal −HT is connected to the cathode of the second thyristor GTOi and to the anode of the second freewheel diode DRLi.

In these two preferred embodiments of the stack device of the invention, the third cooling device R3 (FIG. 2) and the first and fifth cooling devices R1 and R5 (FIG. 3) can be replaced by conductor elements providing the thermal power to be transmitted is small enough.

Figure 4:
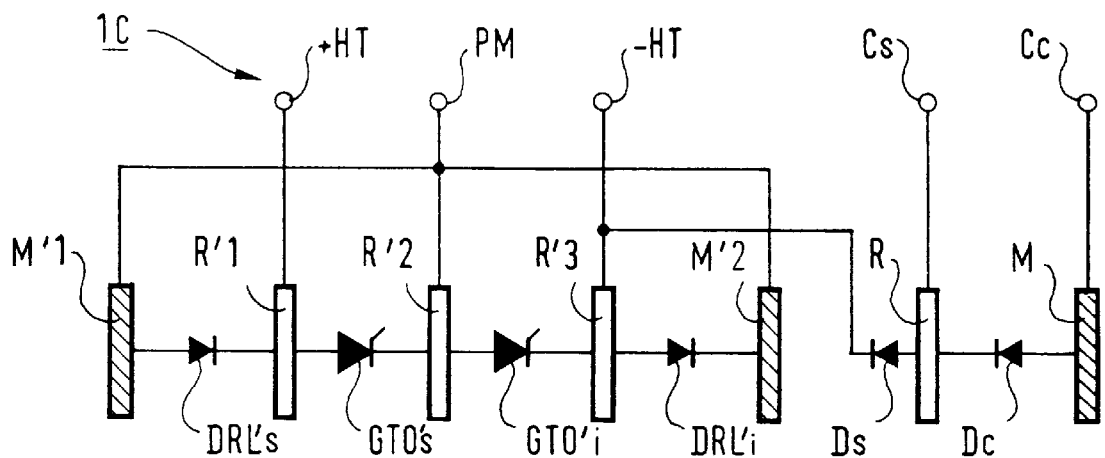
FIGS. 4 and 5 are diagrams of the stack device for a converter in general and more particularly for an inverter, in accordance with the invention.
Figure 5:
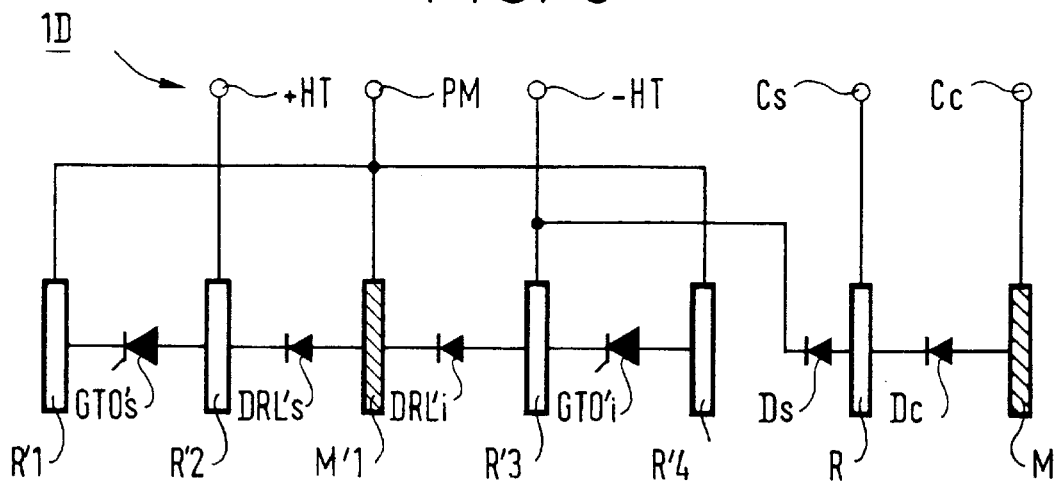

FIGS. 4 and 5 show a diagram of two preferred embodiments of the stack device for a converter, and more particularly for an inverter.

In inverter type applications requiring smaller heat powers to be evacuated, only one face of each freewheel diode requires a cooling device.

Compared with the diagram of the stack device shown in FIG. 2, in order to go from high transmitted thermal power levels to low transmitted thermal power levels while minimizing the number of cooling devices, the conduction direction of each semiconductor is reversed, and freewheel diodes are swapped with thyristors.

It results from the above that the diagram of FIG. 4 shows an inverter stack device 1C comprising, in succession: a first conductor element M'1, a first freewheel diode DRL's, a first cooling device R'1, a first gate turnoff thyristor GTO's, a second cooling device R'2, a second thyristor GTO'i, a third cooling device R'3, a second freewheel diode DRL'i, and a second conductor element M'2.

The anode of the first thyristor GTO's is connected to the potential +HT.

The anode of the second thyristor GTO'i is connected to the terminal PM.

The cathode of the first thyristor GTO's is connected to the terminal PM.

The cathode of the second thyristor GTO'i is connected to the potential −HT.

The anode of the first freewheel diode DRL's is connected to the terminal PM.

The anode of the second freewheel diode DRL'i is connected to the potential −HT.

The cathode of the first freewheel diode DRL's is connected to the potential +HT.

The cathode of the second freewheel diode DRL'i is connected to the terminal PM.

To do this, the connection terminal +HT is connected to the cathode of the first freewheel diode DRL's and to the anode of the first thyristor GTO's.

The connection terminal PM is connected to the cathode of the first thyristor GTO's and to the anode of the second thyristor GTO'i, and also to the anode of the first freewheel diode DRL's and to the cathode of the second freewheel diode DRL'i.

The connection terminal −HT is connected to the cathode of the second thyristor GTO'i and to the anode of the second freewheel diode DRL'i.

As shown in FIG. 5, the stack device 1D for an inverter comprises, in succession: a first cooling device R'1, a first gate turnoff thyristor GTO's, a second cooling device R'2, a first freewheel diode DRL's, a first conductor element M'1, a second freewheel diode DRL'i, a third cooling device R'3, a second thyristor GTO'i, and a third cooling device R'5.

The anode of the first thyristor GTO's is connected to the potential +HT.

The anode of the second thyristor GTO'i is connected to the terminal PM.

The cathode of the first thyristor GTO's is connected to the terminal PM.

The cathode of the second thyristor GTO'i is connected to the potential −HT.

The anode of the first freewheel diode DRL's is connected to the terminal PM.

The anode of the second freewheel diode DRL'i is connected to the potential −HT.

The cathode of the first freewheel diode DRL's is connected to the potential +HT.

The cathode of the second freewheel diode DRL'i is connected to the terminal PM.

To do this, the connection terminal +HT is connected to the anode of the first thyristor GTO's and to the cathode of the first freewheel diode DRL'S.

The connection terminal PM is connected to the anode of the first freewheel diode DRL's and to the of the second freewheel diode DRL'i, and also to the cathode of the first thyristor GTO's and to the anode of the second thyristor GTO'i.

The connection terminal –HT is connected to the anode of the second freewheel diode DRL'i and to the cathode of the second thyristor GTO'i.

Figure 6:
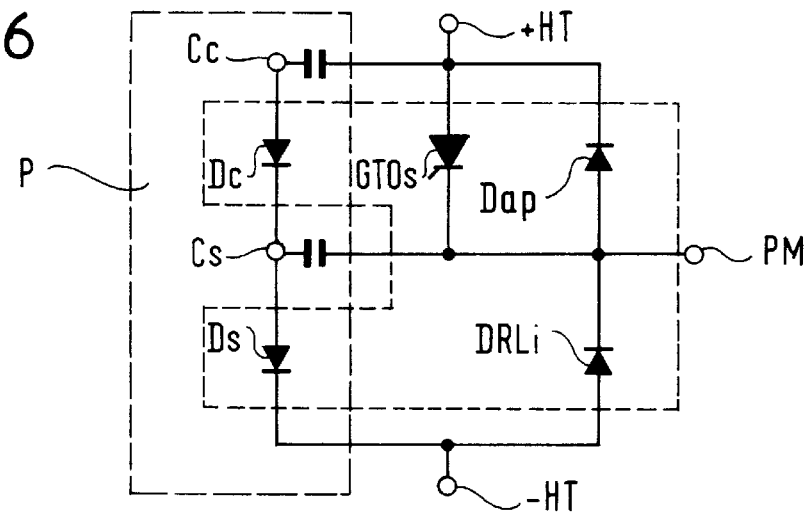
FIG. 6 shows the known electrical layout of one arm of a chopper type converter.

FIG. 6 shows the known electrical circuit of one arm of a chopper type converter.

Figure 7:
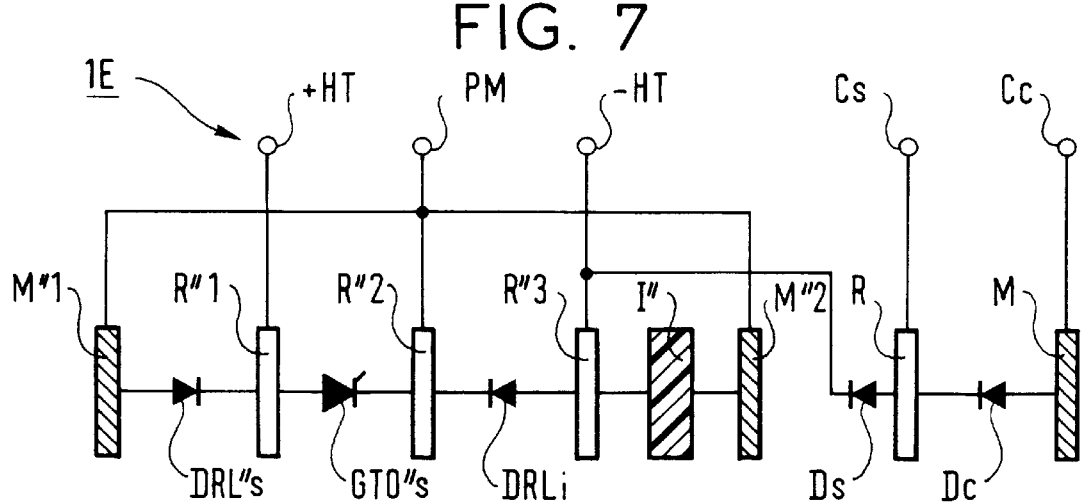
FIGS. 7 and 8 show a diagram of the stack device for a converter in general, and more particularly for a chopper in accordance with the invention.
Figure 8:
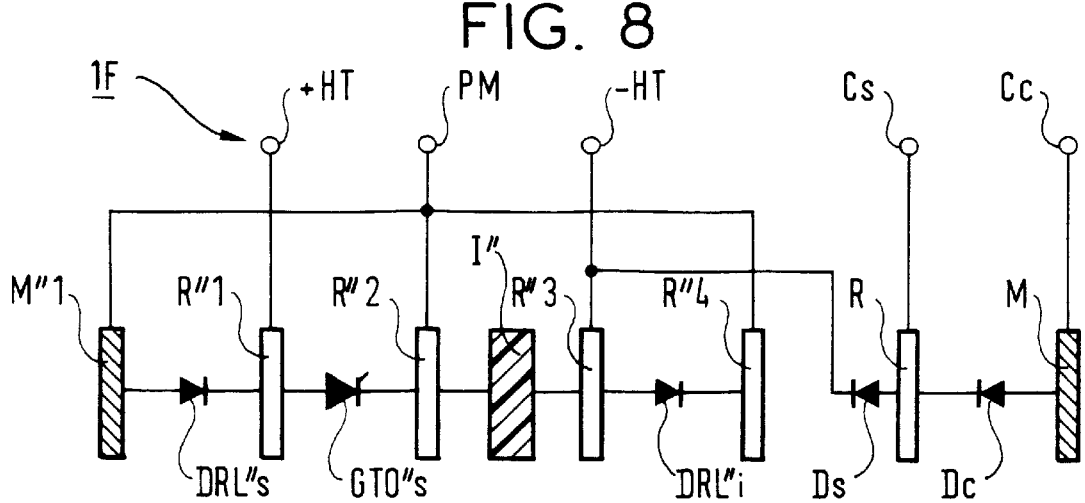

FIGS. 7 and 8 are diagrams of two preferred embodiments of the stack device for a converter, and more particularly for a chopper.

As shown in FIG. 7, the stack device 1E for a chopper comprises, in succession: a first conductor element M"1, a first freewheel diode DRL"s, a first cooling device R"1, a gate turnoff thyristor GTO"s, a second cooling device R"2, a second freewheel diode DRL"i, a third cooling device R"3, an insulating element I", and a second conductor element M"2.

The anode of the thyristor GTO"s is connected to the potential +HT.

The cathode of the thyristor GTO"s is connected to the terminal PM.

The anode of the first freewheel diode DRL"s is connected to the terminal PM.

The anode of the second freewheel diode DRL"i is connected to the potential –HT.

The cathode of the first freewheel diode DRL"s is connected to the potential +HT.

The cathode of the second freewheel diode DRL"i is connected to the terminal PM.

To do this, the connection terminal +HT is connected to the cathode of the first freewheel diode DRL"s and to the anode of the thyristor GTO"s.

The connection terminal PM is connected to the cathode of the thyristor GTO"s and to the cathode of the freewheel diode DRL"i and also to the anode of the first freewheel diode DRL"s.

The connection terminal –HT is connected to the anode of the second freewheel diode DRL"i.

As shown in FIG. 8, the stack device 1F for a chopper comprises, in succession: a first conductor element M"1, a first freewheel diode DRL"s, a first cooling device R"1, a gate turnoff thyristor GTO"s, a second cooling device R"2, an insulating element I", a third cooling device R"3, a second freewheel diode DRL"i, an a fourth cooling device R"4.

The thyristor GTO"s and the insulating element I" are in series;

The anode of the thyristor GTO"s is connected to the potential +HT.

The cathode of the thyristor GTO"s is connected to the terminal PM.

The anode of the first freewheel diode DRL"s is connected to the terminal PM.

The anode of the second freewheel diode DRL"i is connected to the potential –HT.

The cathode of the first freewheel diode DRL"s is connected to the potential +HT.

The cathode of the second freewheel diode DRL"i is connected to the terminal PM.

To do this, the connection terminal +HT is connected to the cathode of the first freewheel diode DRL"s and to the anode of the thyristor GTO"s.

The connection terminal PM is connected to the cathode of the thyristor GTO"s and also to the anode of the first freewheel diode DRL"s and to the cathode of the second freewheel diode DRL"i.

The connection terminal –HT is connected to the anode of the second freewheel diode DRL"i.

As mentioned above, to constitute a complete phase of a semi-conductor circuit, the stack device 1A–1F of the invention is associated successively with a first diode Ds, a cooling device R, a second diode Dc, and a conductor element M.

The cathode of the first diode Ds is connected to the potential –HT.

The anode of the first diode Ds and the cathode of the second diode Dc are connected to the terminal Cs.

The anode of the second diode Dc is connected to the terminal Cc.

A capacitor Cs of the protection circuit P is disposed between the electrical output connection terminal PM and the terminal Cs common to the first and second diodes Ds and Dc.

In these two preferred embodiments of the stack device of the invention, the third cooling devices R"3 (FIG. 7) and the third and fourth cooling devices R"3 and R"4 (FIG. 8) may be replaced by conductor elements when the thermal power to be transmitted is smaller.

We claim:

1. A stack device comprising a stack of gate turnoff thyristors (GTO) and freewheel diodes (DRL) for a semi-conductor circuit, said stack device including first and second electrical power supply connection terminals (+HT and –HT), and an output terminal (PM), wherein the geometrical organization of the wiring of said connection terminals and said output terminal (+HT, PM, and –HT) is predetermined in such a manner as to make it possible to modify the disposition of said thyristors (GTO) and said freewheel diodes (DRL) in said stack, in order to obtain different electrical functions from the semiconductor circuit using a single form of said wiring of said terminals.

2. A device according to claim 1, for a converter, comprising in succession: a first conductor element (M'1), a first freewheel diode (DRL's), a first cooling device (R'1), a first gate turnoff thyristor (GTO's), a second cooling device (R'2), a second gate turnoff thyristor (GTO'i), a third cooling device (R'3), a second freewheel diode (DRL'1), and a second conductor element (M'2); said first connection terminal (+HT) being connected to the cathode of the first freewheel diode (DRL's) and to the anode of the first thyristor (GTO's), said output terminal (PM) being connected to the cathode of said first thyristor (GTO's) and to the anode of the second thyristor (GTO'i), and also to the anode of said first freewheel diode (DRL's) and to the cathode of the second freewheel diode (DRL'i), said second connection terminal (–HT) being connected to the cathode of said thyristor (GTO'i) and to the anode of said second freewheel diode (DRL'i).

3. A device according to claim 1, for a converter, comprising in succession: a first cooling device (R'1), a first gate turnoff thyristor (GTO's), a second cooling device (R'2), a first freewheel diode (DRL's), a first conductor element (M'1), a second freewheel diode (DRL'i), a third cooling device (R'3), a second gate turnoff thyristor (GTO'i), and a fourth cooling device (R'4); said first connection terminal (+HT) being connected to the anode of the first thyristor (GTO's) and to the cathode of the first freewheel diode (DRL's), said output terminal (PM) being connected to the anode of said first freewheel diode (DRL's) and to the cathode of the second freewheel diodes (DRL'i), and also to the cathode of said first thyristor (GTO's) and to the anode of the second thyristor (GTO'i), said second connection terminal (−HT) being connected to the anode of said second freewheel diode (DRL'i) and to the cathode of said second thyristor (GTO'i).

4. A device according to claim 1, further including in succession: a first diode (Ds), a cooling device (R), a second diode (Dc), and a conductor element (M); said first and second diodes (Ds and Dc) being reversed-biased under a voltage of potentials (−HT and +HT) via a capacitor (Cc) of a protection circuit (P), a capacitor (Cs) of said protection circuit (P) being disposed between said output terminal (PM) and a common terminal, common to said first and second diodes (Ds and Dc).

5. A device according to claim 1, for a converter, comprising in succession: a first cooling device (R1), a first gate turnoff thyristor (GTOs), a second cooling device (R2), a first freewheel diode (DRLs), an element selected from a third cooling device (R3) and a conductor element (M), a second freewheel diode (DRLi), a fourth cooling device (R4), a second gate turnoff thyristor (GTOi), and a fifth cooling device (R5); said first connection terminal (+HT) being connected to the anode of the first thyristor (GTOs) and to the cathode of the first freewheel diode (DRLs), said output terminal (PM) being connected to the anode of the first freewheel diode (DRLs) and to the cathode of the second freewheel diode (DRLi), and also to the cathode of said first thyristor (GTOs) and to the anode of the second thyristor (GTOi), and said second connection terminal (−HT) being connected to the anode of said second freewheel diode (DRLi) and to the cathode of said second thyristor (GTOi).

6. A device according to claim 5, in which the element is said conductor element (M) when a thermal power to be transmitted by said stack device is small.

7. A device according to claim 5, in which the element is a third cooling device (R3).

8. A device according to claim 1, for a converter, comprising in succession: a first element selected from a first cooling device (R1) and one of a plurality of conductor elements (M), a first freewheel diode (DRLs), a second cooling device (R2), a first gate turoff thyristor (GTOs), a third cooling device (R3), a second gate turnoff thyristor (GTOi), a fourth cooling device (R4), a second freewheel diode (DRLi), and a second element selected from a fifth cooling device (R5) and another of said plurality of conductor elements (M); said first connection terminal (+HT) being connected to the cathode of the first freewheel diode (DRLs) and to the anode of the first thyristor (GTOs), said output terminal (PM) being connected to the cathode of said first thyristor (GTOs) and to the anode of the second thyristor (GTOi), and also the anode of said first freewheel diode (DRLs) and to the cathode of the second freewheel diode (DRLi), and said second connection terminal (−HT) being connected to the cathode of said second thyristor (GTOi) and to the anode of said second freewheel diode (DRLi).

9. A device according to claim 8, in which the first and second elements are conductor elements (M) of said plurality of conductor elements when a thermal power to be transmitted by said stack device is small.

10. A device according to claim 8, in which the first and second elements are said first and fifth cooling devices (R1) and (R5), respectively.

11. A device according to claim 1, for a converter, comprising in succession: a first conductor element (M"1), a first freewheel diode (DRL"s), a cooling device (R"1), a gate turnoff thyristor (GTO"s), a second cooling device (R"2), a second freewheel diode (DRL'i), an element selected from a third cooling device (R"3) and a conductor element (M), an insulating element (I"), and a second conductor element (M"2); said first connection terminal (+HT) being connected to the cathode of the first freewheel diode (DRL"s) and to the anode of the thyristor (GTQ"s), said output terminal (PM) being connected to the cathode of said thyristor (GTO"s) and to the cathode of the said second freewheel diode (DRL"i), and also to the anode of said first freewheel diode (DRL"s), said second connection terminal (−HT) being connected to the anode of said second freewheel diode (DRL"i).

12. A device according to claim 11, in which the element is said conductor element (M) when a thermal power to be transmitted by said stack device is small.

13. A device according to claim 11, in which the element is said third cooling device (R"3).

14. A device according to claim 1, for a converter, comprising in succession: a first conductor element (M"1), a first freewheel diode (DRL's), a first cooling device (R"1), a gate turnoff thyristor (GTQ"s), a second cooling device (R"2), an insulating element (I"), a first element selected from a third cooling device (R"3) and one of a plurality of conductor elements (M), a second freewheel diode (DRL"i), and a second element selected from a fourth cooling device (R"4) and another of said plurality of conductor elements (M); said first connection terminal (+HT) being connected to the cathode of the first freewheel diode (DRL"s) and to the anode of the thyristor (GTO"s), said output terminal (PM) being connected to the cathode of said thyristor (GTO"s) and to the anode of said first freewheel diode (DRL"s), and also to the cathode of the second freewheel diode (DRL"i), said second connection terminal (−HT) being connected to the anode of said second freewheel diode (DRL"i).

15. A device according to claim 14, in which the first or the second elements are one of said plurality of conductor elements when a thermal power to be transmitted by said stack device is small.

16. A device according to claim 14, in which the first element is the third cooling device (R"3) and the second element is the fourth cooling device (R"4).

* * * * *